Feb. 16, 1971 R. F. FISCHER 3,564,518

MAGNETIC SINGLE WALL DOMAIN PROPAGATION DEVICE

Filed April 4, 1969 2 Sheets-Sheet 1

INVENTOR
R. F. FISCHER
BY Herbert M. Shapiro
ATTORNEY

MAGNETIC SINGLE WALL DOMAIN PROPAGATION DEVICE

Filed April 4, 1969 2 Sheets-Sheet 2

United States Patent Office 3,564,518
Patented Feb. 16, 1971

3,564,518
MAGNETIC SINGLE WALL DOMAIN PROPAGATION DEVICE

Robert F. Fischer, Livingston, N.J., assignor to Bell Telephone Laboratories, Incorporated, Murray Hill, N.J., a corporation of New York Filed Apr. 4, 1969, Ser. No. 813,475
Int. Cl. G11c *11/14, 19/00*
U.S. Cl. 340—174 5 Claims

ABSTRACT OF THE DISCLOSURE

An overlay array of magnetically soft dots permits a reduction in the complexity of a drive wiring configuration for propagating single wall domains. The dots are offset with respect to the wiring configuration defining an astable position into which a domain is moved in each instance. Unidirectional movement of domains is ensured by the dots thus permitting two-phase propagation operation and a planar geometry for the wiring.

FIELD OF THE INVENTION

This invention relates to magnetic devices and more particularly to such devices wherein single wall reverse-magnetized domains are moved in a sheet of magnetic material.

BACKGROUND OF THE INVENTION

A single wall domain is a magnetic domain which is bounded by a single domain wall which closes upon itself and has a geometry which does not intersect the boundary of the sheet in which such a domain is moved. The domain conveniently assumes the shape of a circle (top view) which has a stable diameter determined by the material parameters. A bias field of a polarity to contract domains ensures that domains can be moved as stable entities. Single wall domain propagation devices are described in the Bell System Technical Journal, October 1967, volume 46, pages 1901 et seq.

The movement of a single wall domain is accomplished normally by consecutively offset localized fields (actually field gradients) of a polarity to attract domains. A domain follows the consecutive attracting fields along any arbitrary path from input to output positions in the sheet. A three-phase propagation operation usually provides the directionality along a selected propagation path in a manner well understood in the art.

The pattern of the propagation wiring, employed to generate the attracting fields when pulsed, normally assumes a geometry dictated by the material in which the domains are moved. A typical material is a rare earth orthoferrite. These materials have preferred directions of magnetization normal to the plane of the sheet. If the sheet is saturated magnetically in one direction, say a negative direction, normal to the plane of the sheet, the magnetization in the single wall domain is in the opposite direction, a positive direction. The domain, then, may be represented (top view) as an encircled plus sign and the propagation wiring pattern is conveniently in the form of consecutively offset closed loops to correspond to the circular geometry of the domain. This wiring pattern is described in copending application Ser. No. 579,931, filed Sept. 16, 1966 for A. H. Bobeck, U. F. Gianola, R. C. Sherwood, and W. Shockley (now Patent 3,460,116).

Consecutively arranged conductor loops operated on a three-phase basis are arranged such that conductors cross over one another. But, it has long been recognized that conductor patterns are less costly to produce if they are of a planar configuration. That is to say, processing techniques are more expensive and yields are generally lower if deposited conductors cross over one another.

An object of this invention is a domain propagation device including a planar propagation wiring configuration.

BRIEF DESCRIPTION OF THE INVENTION

The invention is based on the recognition that a magnetically soft overlay on the surface of a sheet in which single wall domains can be moved provides closure for flux associated with those domains and thus defines a preferred position for such domains. In one embodiment of this invention, such an overlay is in the form of an array of dots which is offset with respect to the loops of a drive wiring configuration. Because of this offset, domains advanced by pulses in the wires are advanced, in each instance, into positions which are unstable. As a consequence, a domain, so advanced, is displaced, when those pulses are terminated, providing unidirectional movement with a wiring configuration which is, basically, a relatively simple two-phase arrangement.

DETAILED DESCRIPTION

Figure 1:
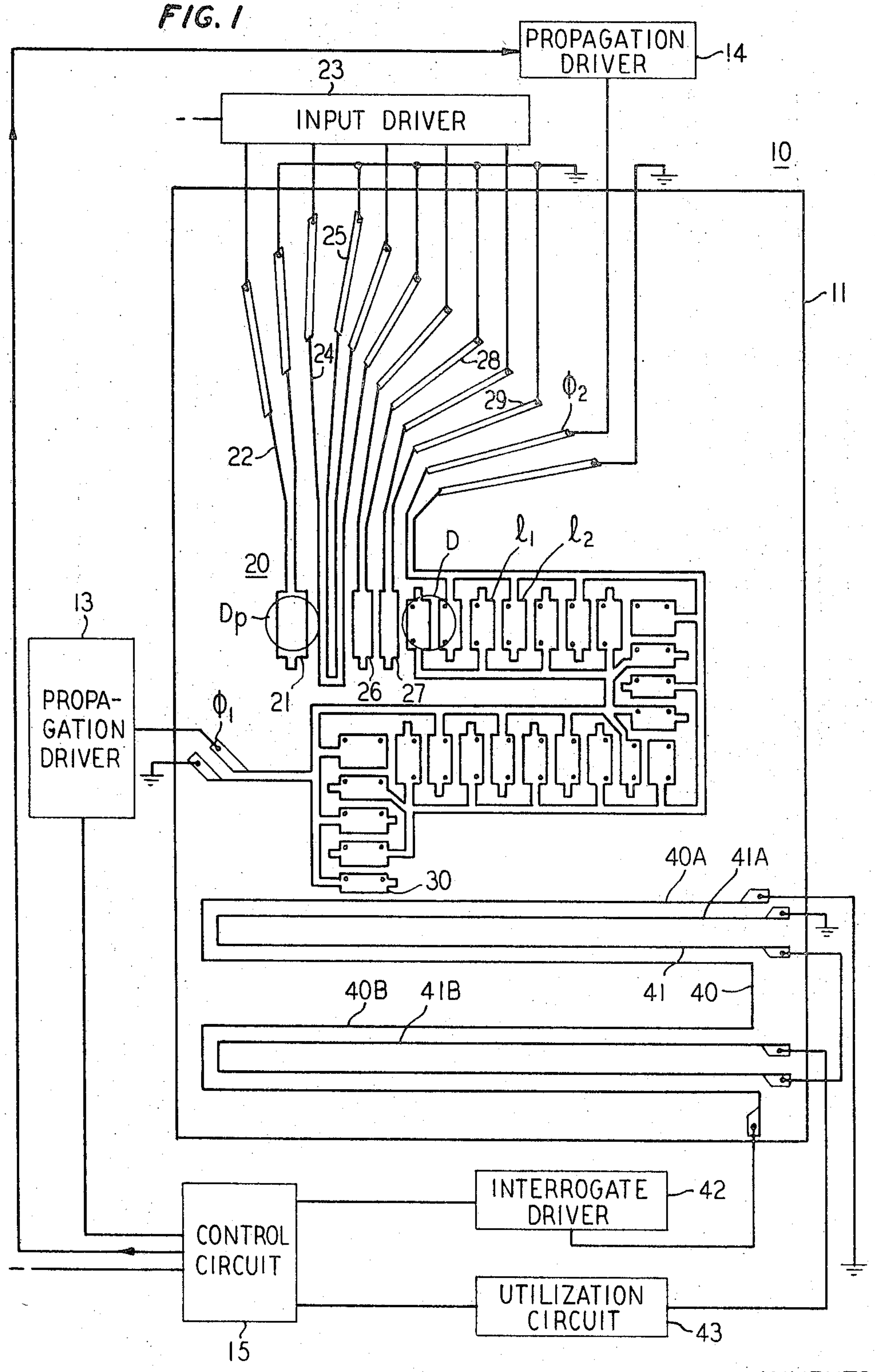
FIG. 1 is a view of a domain propagation arrangement in accordance with the invention.

FIG. 1 shows a domain propagation arrangement 10 in accordance with this invention. The arrangement comprises a sheet 11 of magnetic material in which single wall domains can be moved.

A domain propagation circuit is defined on the surface of sheet 11 by conductors $\phi_1$ and $\phi_2$. These conductors are connected between propagation drivers 13 and 14, respectively, and ground. Drivers 13 and 14 are connected to control circuit 15 and are activated in the alternative. Conductors $\phi_1$ and $\phi_2$ each define a series of loops which are interleaved to generate attracting magnetic fields at many positions in sheet 11 as may be determined by the familar right-hand rule when each conductor is pulsed.

It is a particular advantage, in accordance with this invention, that conductors $\phi_1$ and $\phi_2$ interleave but do not cross over one another. Thus, a planar propagation configuration is realized as is shown in FIG. 1. The circuit is operated on a two-phase basis.

The directionality of a domain moved by such a circuit is now demonstrated.

Figure 2:
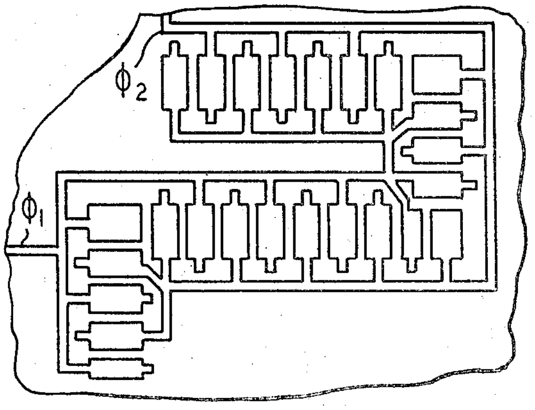
FIGS. 2, 3, 4 and 5 are views of portions of the circuit of FIG. 1.

FIG. 2 shows the circuits $\phi_1$ and $\phi_2$. These circuits are superimposed on an array of magnetically soft dots M shown in FIG. 3. Both the propagation circuits and the dots are deposited, conveniently by well-known photodeposition techniques on the surface of sheet 11. The dots, however, are offset with respect to the circuits $\phi_1$ and $\phi_2$. This is clear from FIG. 3 which shows the dots associated with each loop offset slightly from or about at the center of the loop as indicated by broken center line C for loop 1. When one of the propagation circuits is pulsed, a domain, represented by broken circuit D' in FIG. 4, tends to center on the loop which generates the closest attracting field.

Figure 4:
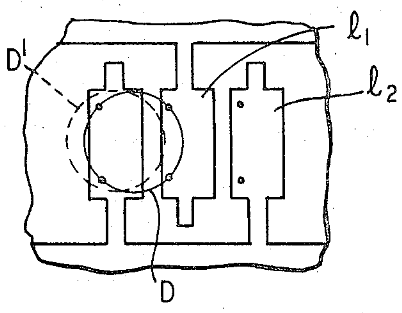
Figure 5:
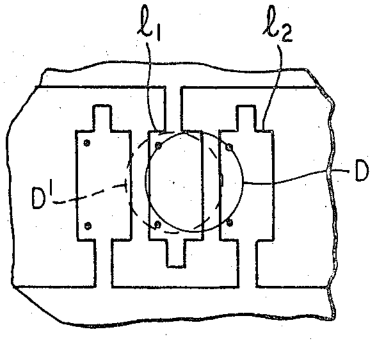

When a propagation field terminates, the domain tends to move to a position symmetrical with respect to the dots as shown by the position indicated by the circle D in FIG. 4. Each time a conductor $\phi_1$ or $\phi_2$ is pulsed, a domain moves to center itself with respect to the next consecutive loop to the right as viewed in FIG. 4. Each time a propagation pulse terminates, the domain so moved is offset to the right, as viewed, to a position from which it is attracted to the right by the next consecutive propagation pulse. The process repeats, as shown in FIG. 5.

Domains are introduced for propagation conveniently by the input circuit shown at 20 in FIG. 1. A domain D*p* is maintained permanently at loop 21 defined by a conductor 22 connected between input driver 23 and ground. A pair of hairpin conductors 24 and 25 separate loop 21 from consecutive loops 26 and 27. These latter loops are defined by conductors 28 and 29, respectively, connected between driver 23 and ground.

In operation, conductor 24 is pulsed in a manner to generate a field to attract domain D*p* to the right as viewed. Thereafter, each of conductors 22 and 28 is pulsed in a manner to attract domain D*p* and conductor 25 is pulsed in a manner to repel domain D*p*. As a consequence, domain D*p* is divided, one part being returned to the position shown in FIG. 1; the other (D) is positioned symmetrically with respect to loop 26. Domain D is advanced to the beginning of the propagation circuit by an attracting field generated at loop 27 by a next consecutive pulse on conductor 29. Of course, the absence of a pulse on conductor 24 during this input sequence results in the absence of a domain for propagation. The presence and absence of domains are taken usually to represent binary ones and zeros respectively. Thus it is clear that information is introduced in this manner for propagation. Driver 23 is connected to control circuit 15 for synchronization and activation to this end.

Information, so introduced, is advanced by the propagation circuits, until a pulse on conductor $\phi_1$ advances a domain (or absence thereof) to loop 30. At that juncture in the operation, information is a position for detection.

The detection circuit comprises two sets of series conductors 40 and 41 each having a hairpin geometry. Conductor 40 has at portion 40A adjacent loop 30 and is connected between an interrogate driver 42 and ground. Conductor 41 similarly includes a portion 41A adjacent loop 30 and is connected between a utilization circuit 43 and ground. On a propagation phase during which conductor $\phi_2$ is pulsed, driver 42 pulses conductor 40. As a result, any domain present at loop 30 is expanded into the area of sheet 11 encompassed by portion 40A of conductor 40 and then collapsed thus inducing a pulse in conductor 41 for detection by utilization circuit 43. The double hairpin construction is employed to reduce noise occasioned by the interrogate pulse on conductor 40 in accordance with well understood noise cancellation schemes. Driver 42 and circuit 43 are connected to control circuit 15 for synchronization.

The various sources and circuits herein may be any such elements capable of operating in accordance with this invention.

The circuit of FIG. 1 is basically a two-phase circuit. The illustrative input circuit, however, introduces domains in four-phase intervals in order to maintain a suitable spacing between adjacent domains thus avoiding interactions therebetween.

The basically square-corner arrangement of the propagation circuit as shown in FIG. 1 is conveniently rounded into a serpentine configuration (not shown) as lower coercive (i.e., increased interaction) force material is used for sheet 11. The rounded corners permit the distance between domains to be maintained relatively constant there in order, for example, to avoid the possibility of a domain missing a propagation loop at the corners at high speeds due to domain interactions. In the serpentine arrangement, the area encompassed by each loop at the corner is essentially the same.

Of course, propagation circuits may be of a linear configuration in which no corners are necessary. The illustrative configuration, however, demonstrates a technique for realizing a shift reigster with a larger number of stages than a given magnetic sheet may be able to accommodate linearly.

Figure 3:
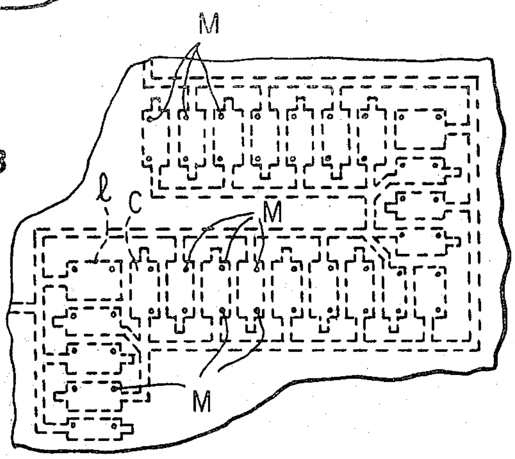

The magnetic dots of FIG. 3 typically comprise permalloy deposited by photolithographic techniques. The dots, in addition to permitting conductor configuration simplification as described, act as keepers to enhance the stability of domains by reducing effects of interactions and extraneous fields.

In one specific example, a sheet of thulium orthoferrite ($TmFeO_3$) two mils thick, having a coercive force of 0.1 oersted in which domains four mils in diameter are moved, permits the movement of domains spaced apart 12 mils in response to propagation fields of 10 oersteds$\pm$10 percent. In this example, propagation loops are typically 3 x 5.5 mils. The dots are 1.0 mil in diameter and 4,000 A. thick spaced 1.5 mils from the side of the associated loop. The loops are nominally on four mil centers. The dots are also on four mil centers and, in effect, provide a 5.0 oersted third phase.

The detection circuitry is elongated primarily to enable an increased output. For domains four mils in diameter, loop 40A may be eight mils by 60 mils. Outputs of 1.0 millivolt microsecond are provided in this manner.

What has been described is considered only illustrative of the principles of this invention. Accordingly, various modifications may be made therein by one skilled in the art without departing from the spirit and scope of this invention.

What is claimed is:

1. A device comprising a sheet of magnetic material in which single wall domains can be moved, and means for moving single wall domains in said sheet, said last-mentioned means comprising a plurality of conductors for defining a sequence of positions for domains and means having fixed positions asymmetrically disposed with respect to said plurality of conductors for making said positions unstable for domains in a manner to cause a displacement of domains toward next consecutive positions in the absence of pulses in said conductors.

2. A device comprising a sheet of magnetic material in which single wall domains can be moved, and means for moving single wall domains in said sheet, said last-mentioned means comprising first and second conductors each including a plurality of spaced apart loops, the loops of said first conductor being interleaved with those of said second conductor for defining a sequence of positions for single wall domains and a pattern of elements arranged asymmetrically in fixed positions with respect to said loops for displacing a single wall domain advanced by a field generated at one of said loops toward a next consecutive position in the absence of pulses in said conductors.

3. A device in accordance with claim 2 wherein said pattern comprises an array of magnetically soft dots.

4. A device in accordance with claim 3 including means for activating said first and second conductors alternately.

5. A device in accordance with claim 4 including means for introducing single wall domains into said sheet and means for detecting the presence and absence of domains in said sheet.

References Cited

UNITED STATES PATENTS

| | | | |
|---|---|---|---|
| 3,460,116 | 8/1969 | Bobeck et al. | 340—174 |
| 3,470,547 | 9/1969 | Bobeck | 340—174 |

STANLEY M. URYNOWICZ, Jr., Primary Examiner